(12) United States Patent
Spence et al.

(10) Patent No.: US 7,195,314 B2
(45) Date of Patent: Mar. 27, 2007

(54) INFANT CAR SEAT

(75) Inventors: Scott Spence, Dayton, OH (US); Troy Richardson, California, KY (US)

(73) Assignee: Evenflo Company, Inc., Vandalia, OH (US)

( * ) Notice: Subject to any disclaimer, the term of this patent is extended or adjusted under 35 U.S.C. 154(b) by 0 days.

(21) Appl. No.: 11/074,016

(22) Filed: Mar. 7, 2005

(65) Prior Publication Data

US 2006/0208543 A1 Sep. 21, 2006

(51) Int. Cl.
*A47C 1/08* (2006.01)

(52) U.S. Cl. .............. 297/250.1; 297/410; 297/188.01; 297/188.14; 297/188.15

(58) Field of Classification Search ............. 297/250.1, 297/410, 188.01, 188.14, 188.15
See application file for complete search history.

(56) References Cited

U.S. PATENT DOCUMENTS

| | | | |
|---|---|---|---|
| 4,754,999 A | 7/1988 | Kain | |
| 4,887,784 A | 12/1989 | Kayali | |
| 4,984,722 A | 1/1991 | Moore | |
| 5,228,745 A | 7/1993 | Hazel | |
| 5,328,143 A | 7/1994 | Koorey et al. | |
| 5,358,307 A | 10/1994 | Shafer et al. | |
| 5,383,711 A | 1/1995 | Houghteling | |
| 5,503,297 A | 4/1996 | Frankel | |
| 5,522,527 A | 6/1996 | Tsai | |
| 5,544,940 A * | 8/1996 | Stevens | 297/411.28 |
| 5,615,925 A | 4/1997 | Kain | |
| 5,690,387 A | 11/1997 | Sarti | |
| 5,829,834 A | 11/1998 | Silverman | |
| 5,865,412 A | 2/1999 | Mason | |
| 5,915,787 A | 6/1999 | Brookman | |
| 6,000,753 A | 12/1999 | Cone, II | |
| 6,030,047 A | 2/2000 | Kain | |
| 6,095,471 A | 8/2000 | Huang | |
| 6,123,389 A | 9/2000 | O'Connor et al. | |
| 6,135,553 A | 10/2000 | Lovie et al. | |
| 6,139,100 A | 10/2000 | Baskin-Lockman et al. | |
| 6,139,101 A | 10/2000 | Berringer et al. | |
| 6,155,638 A | 12/2000 | Bapst | |
| 6,206,470 B1 | 3/2001 | Baloga et al. | |
| 6,283,042 B1 | 9/2001 | Wargo et al. | |
| 6,305,749 B1 | 10/2001 | O'Connor et al. | |
| 6,378,950 B1 | 4/2002 | Takamizu et al. | |
| 6,428,099 B1 | 8/2002 | Kain | |
| 6,464,294 B1 | 10/2002 | Kain | |
| 6,467,839 B1 | 10/2002 | Kain | |
| 6,474,735 B1 | 11/2002 | Carnahan et al. | |
| 6,478,372 B1 | 11/2002 | Lemmeyer et al. | |
| 6,481,794 B1 | 11/2002 | Kassai et al. | |
| 6,491,348 B1 * | 12/2002 | Kain | 297/484 |
| 6,550,862 B2 | 4/2003 | Kain | |
| 6,592,180 B2 | 7/2003 | Combs | |

(Continued)

*Primary Examiner*—Laurie K. Cranmer
(74) *Attorney, Agent, or Firm*—Taft, Stettinius & Hollister LLP

(57) ABSTRACT

An infant car seat having a headrest that can be manually adjusted to accommodate infants of different heights. The headrest has a lever with a prong that engages a series of pockets in the seat body, allowing the headrest to be fixed in several different positions. The car seat can have removable armrests that slide into openings in the sides of the seat body and lock in place. The car seat can have a foldable cup holder that clips onto the side of the seat body.

10 Claims, 11 Drawing Sheets

U.S. PATENT DOCUMENTS

| | | |
|---|---|---|
| 6,592,183 B2 | 7/2003 | Kain |
| 6,607,243 B2 | 8/2003 | Kain |
| 6,612,649 B2 * | 9/2003 | Kain ........................ 297/250.1 |
| 6,623,074 B2 | 9/2003 | Asbach et al. |
| 6,644,747 B2 | 11/2003 | Jones |
| 6,648,416 B2 | 11/2003 | O'Connor et al. |
| 6,666,505 B2 | 12/2003 | Greger et al. |
| 6,682,143 B2 | 1/2004 | Amirault et al. |
| 6,749,260 B2 * | 6/2004 | Abel ........................ 297/250.1 |
| 6,811,216 B2 * | 11/2004 | Sedlack ................... 297/250.1 |
| 6,827,399 B2 * | 12/2004 | Schoor et al. ............ 297/250.1 |
| 6,908,151 B2 * | 6/2005 | Meeker et al. ............ 297/250.1 |
| 2004/0090094 A1 * | 5/2004 | Williams et al. ........ 297/188.11 |

* cited by examiner

INFANT CAR SEAT

BACKGROUND OF THE INVENTION

This invention relates to an infant car seat, and in particular to an infant car seat having a manually adjustable headrest, removable arm rests, and a removable, foldable cup holder.

SUMMARY

The present invention provides an infant car seat having a headrest that can be manually adjusted to accommodate infants of different heights. The headrest has a lever with a prong that engages a series of pockets in the seat body, allowing the headrest to be fixed in several different positions. The car seat can have removable armrests that slide into openings in the sides of the seat body and lock in place. The car seat can have a foldable cup holder that clips onto the side of the seat body.

Accordingly, it is a first aspect of the present invention to provide an infant car seat having: (a) a seat body having a plurality of pockets for receiving a prong; (b) a headrest contoured for supporting the head of an infant, the headrest joined to the seat body and adapted for sliding with respect to the seat body; and (c) a lever joined to the headrest and having a prong adapted for engaging any one of the plurality of pockets, whereby the headrest can be positioned in any one of a plurality of discrete positions with respect to the seat body, the plurality of discrete positions corresponding to the plurality of pockets in the seat body. In detailed embodiments, the pockets can be semicylindrical in shape and oriented parallel to each other, and the pockets can be integrally molded into the seat body.

In an alternate detailed embodiment of the first aspect of the present invention, the lever is pivotally joined to the headrest. In a more detailed embodiment, the lever includes a surface adapted for receiving a force applied by a user, whereby the user can actuate the lever. In an even more detailed embodiment, the infant car seat includes at least one spring located between the headrest and the lever for restoring the lever to its original position after being actuated by the user. In an even more detailed embodiment, the lever is originally positioned such that its prong is engaged with one of the plurality of pockets in the seat body to prevent the headrest from sliding with respect to the seat body; and, upon actuation of the lever by the user, the lever becomes positioned such that its prong is disengaged from the pockets in the seat body, whereby the user can slide the headrest with respect to the seat body.

It is a second aspect of the present invention to provide an infant car seat including: (a) a seat body having an opening for accepting a removable armrest; and (b) an armrest having an arm portion and a mounting portion, the mounting portion having: (i) an attachment fairing adapted for sliding into the opening on the seat body, and (ii) a locking tab having a flange adapted for holding the mounting portion in place within the opening. In a detailed embodiment, the seat body includes a release lever located inside the opening; and, upon sliding the attachment fairing into the opening, the locking tab slides between the release lever and the top edge of the opening such that the flange on the locking tab is held in place against the top edge of the opening, whereby the attachment fairing is locked in place within the opening. In a more detailed embodiment, upon depression of the release lever and locking tab by a user, the flange on the locking tab becomes disengaged from the top edge of the opening, allowing the mounting fairing to slide out of the opening, whereby the armrest may be removed from the seat body.

It is a third aspect of the present invention to provide an infant car sear including: (a) a seat body; and (b) a foldable cup holder having a clip adapted for being joined to the seat body. In a more detailed embodiment, the foldable cup holder includes: (a) a body having a clip for attaching the foldable cup holder to the seat body; (b) a cover pivotally joined to the body and capable of rotating downward into a horizontal position perpendicular to the body, and incapable of rotating beyond such horizontal position, whereby the cover can support the weight of a cup placed thereon; and (c) a ring pivotally joined to the body and capable of rotating upward into a horizontal position perpendicular to the body, and having a flange that engages the body to hold the ring in such horizontal position, whereby the ring can apply horizontal restoring forces to a cup placed within the ring in order to prevent the cup from tipping.

Any of these aspects of the present invention, or embodiments thereof, can be practiced together.

DETAILED DESCRIPTION

Figure 1:
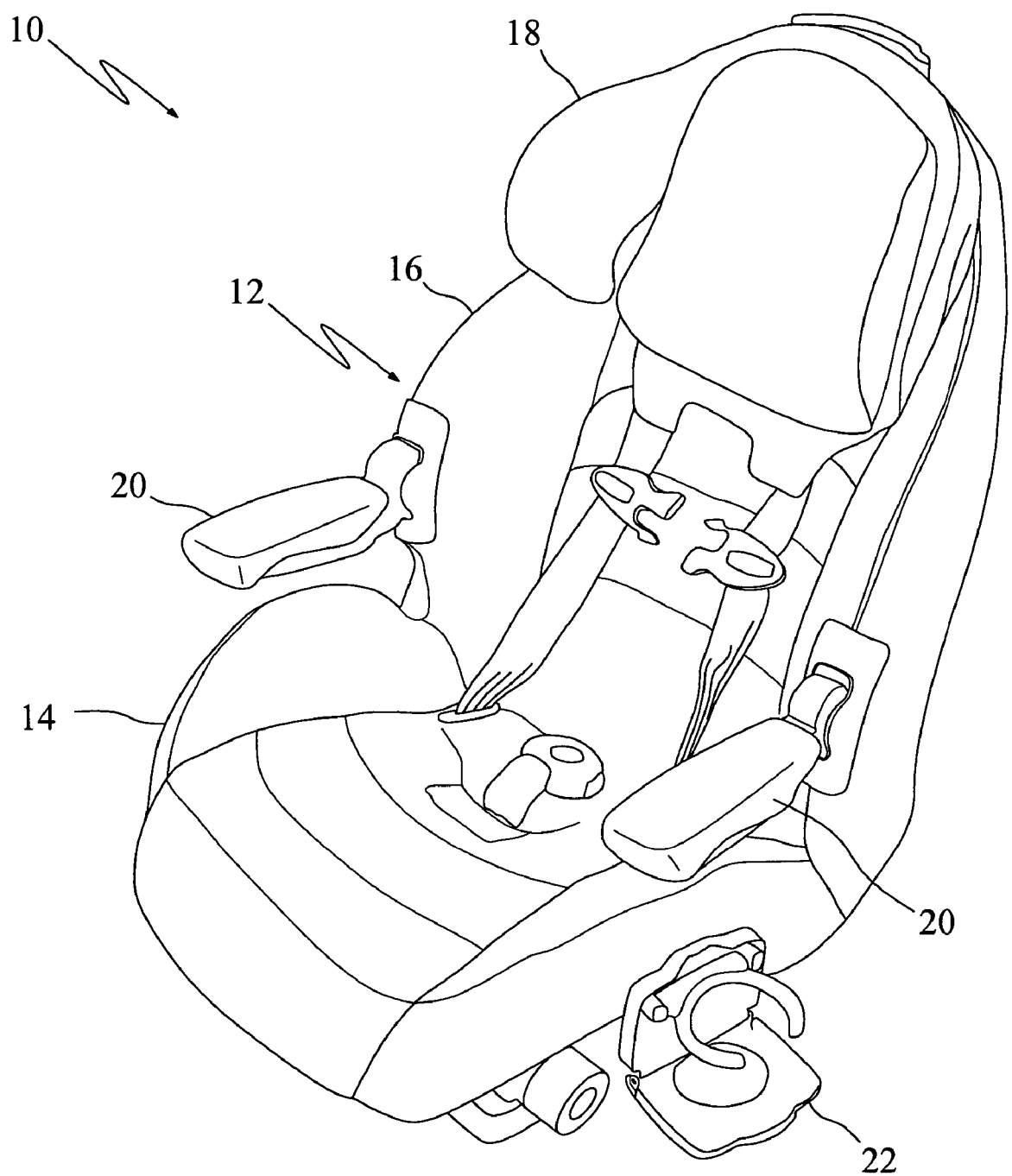
FIG. 1 shows a front perspective view of the car seat according to an embodiment of the present invention.

FIG. 1 shows a front perspective view illustrating the main components of a car seat according to an embodiment of the present invention. The car seat 10 includes a main body 12 having an approximately horizontal seat portion 14 joined to an approximately vertical back portion 16. A headrest 18 is joined to the back portion 16 of the body 12 and can be adjusted, as explained below. Armrests 20 can be removably affixed to the back portion 16 of the body 12. A cupholder 22 can be removably affixed to the seat portion 14 of the body 12. The car seat 10 can be covered with padding to provide cushioning, as depicted in FIG. 1.

Figure 2:
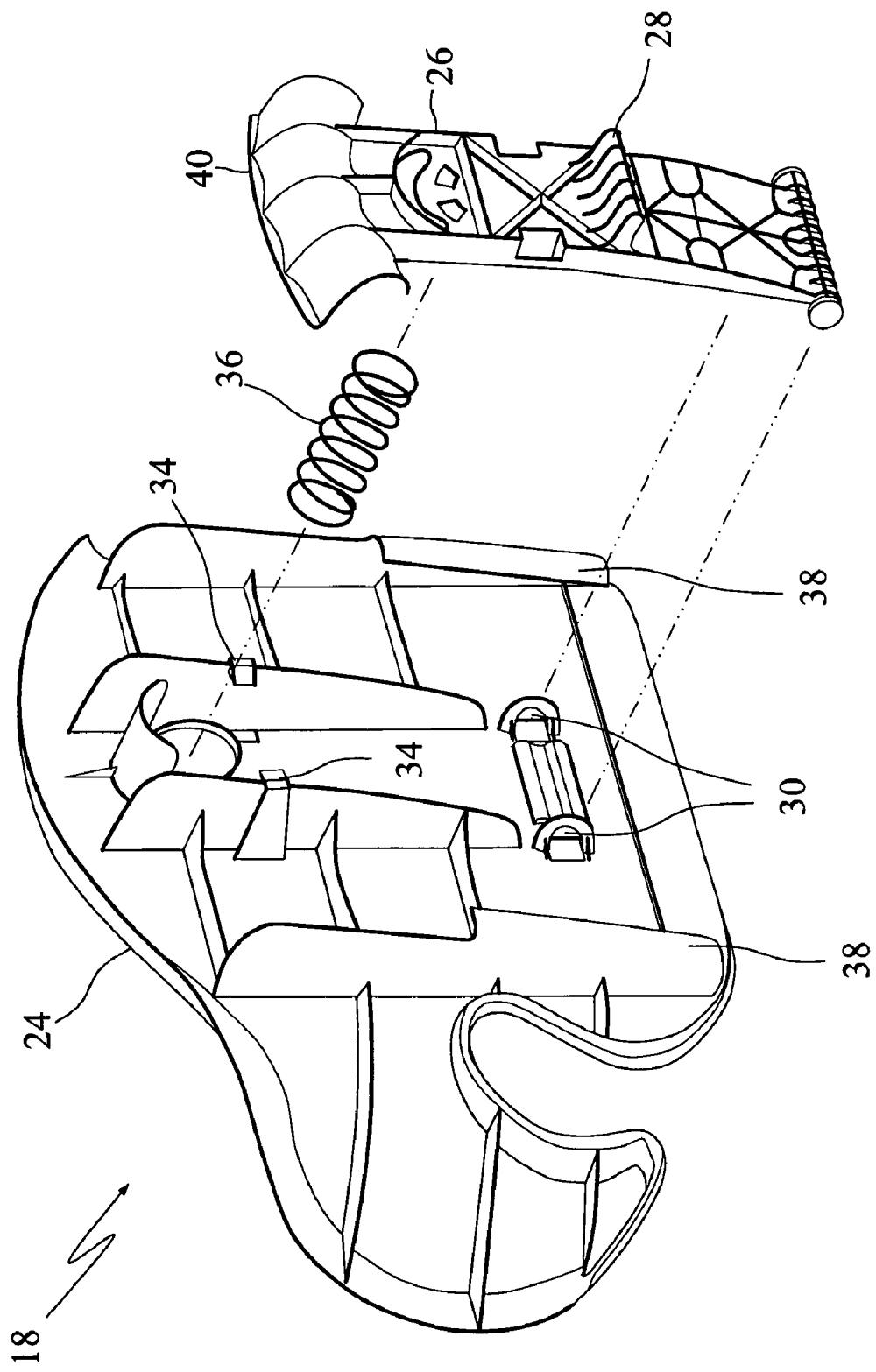
FIG. 2 shows the headrest of the car seat according to an embodiment of the present invention.

The headrest 18 can be manually adjusted by the user to accommodate infants of different heights. FIG. 2 shows a close-up view of the headrest 18. The headrest 18 includes a headrest panel 24 contoured for supporting the head of an infant, and a lever 26. The lever 26 has a prong 28 that engages the seat body 12, as explained below. The lever 26 is joined to the headrest panel 24 at two pivot points 30 such that the lever 26 can rotate about an axis defined by the pivot points. Tabs 34 on the headrest panel 24 hold the lever 26 in place, allowing a narrow range of rotation. Spring 36, which is located between the headrest panel 24 and the lever 26, provides restoring force to bias the lever such that its prong 28 is normally in the extended position.

Figure 3:
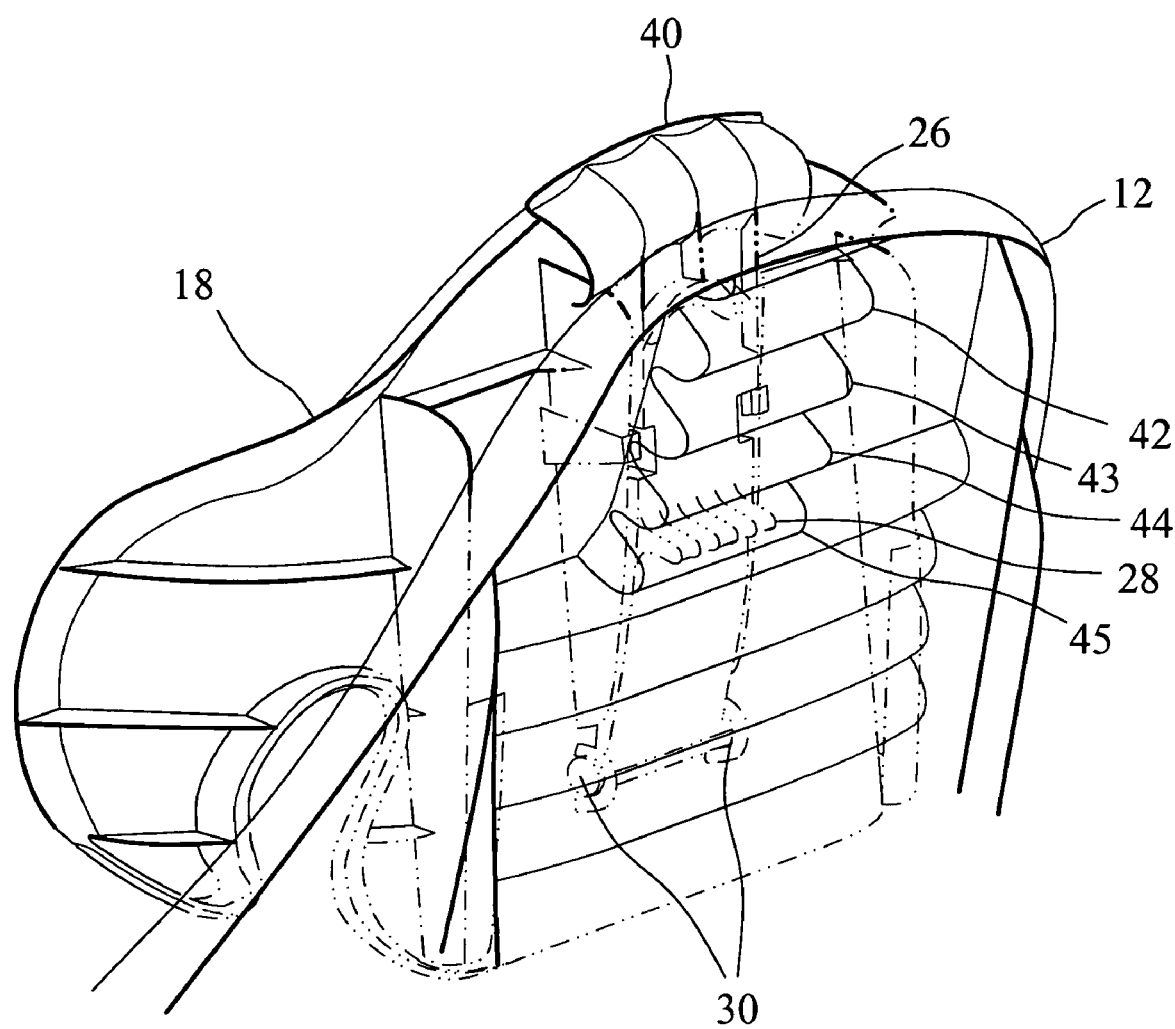
FIG. 3 shows the headrest in the retracted (down) position according to an embodiment of the present invention.
Figure 4:
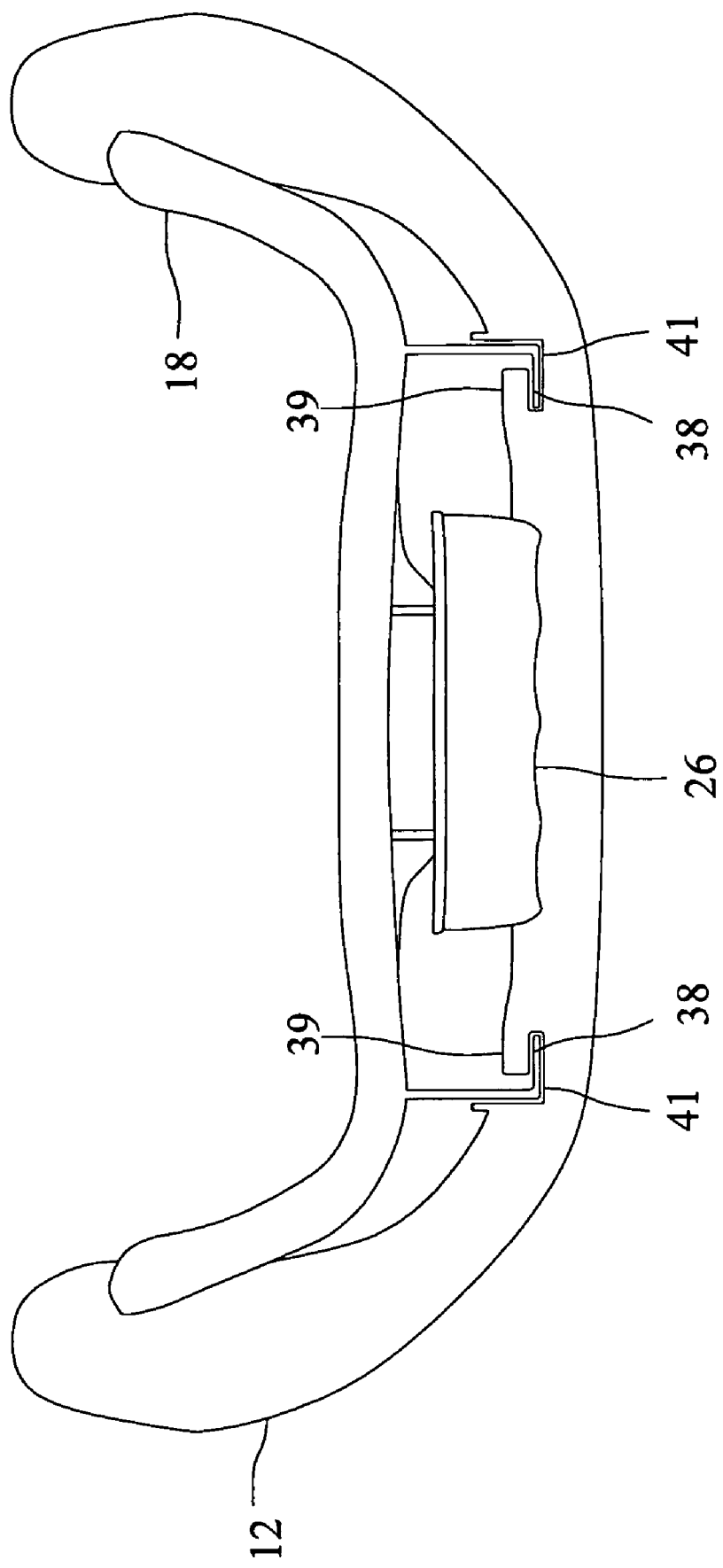
FIG. 4 shows a top view illustrating the interaction of the flanges on the headrest with the tracks on the seat body, allowing the headrest to slide vertically with respect to the seat body, according to an embodiment of the present invention.

FIG. 3 shows the headrest 18 joined to the seat body 12. The headrest 18 is held in place by flanges 38 (shown on the headrest in FIG. 2), allow the headrest to slide in a vertical direction relative to the seat body 12. The top view of FIG. 4 illustrates how these flanges 38 on the headrest 18 fit into tracks 41 in the seat body. The flanges 38 are held into these tracks 41 by flanges 39 on the seat body 12. The headrest 18 is therefore joined to the seat body 18 and cannot move horizontally (i.e. perpendicular to the flanges 38 and the flanges 39) with respect to the seat body 12, but the headrest 18 can slide vertically (i.e. parallel to the flanges 38 and the flanges 39) with respect to the seat body 12.

Returning to FIG. 3, the headrest can be adjusted by the user to assume one of a plurality of different height positions. The seat body 12 contains a plurality of semicylindrical pockets 42, 43, 44, and 45 for engaging the prong 28 of the lever 26, locking the headrest 18 in place. The headrest 18 can be adjusted to different positions (i.e. a different height above the seat portion 14 of the car seat 10) depending on which pocket the ridge 28 is engaged with. These possible positions for the headrest, which are determined by the number and spacing of the pockets, can be referred to as the "discrete positions."

Figure 5:
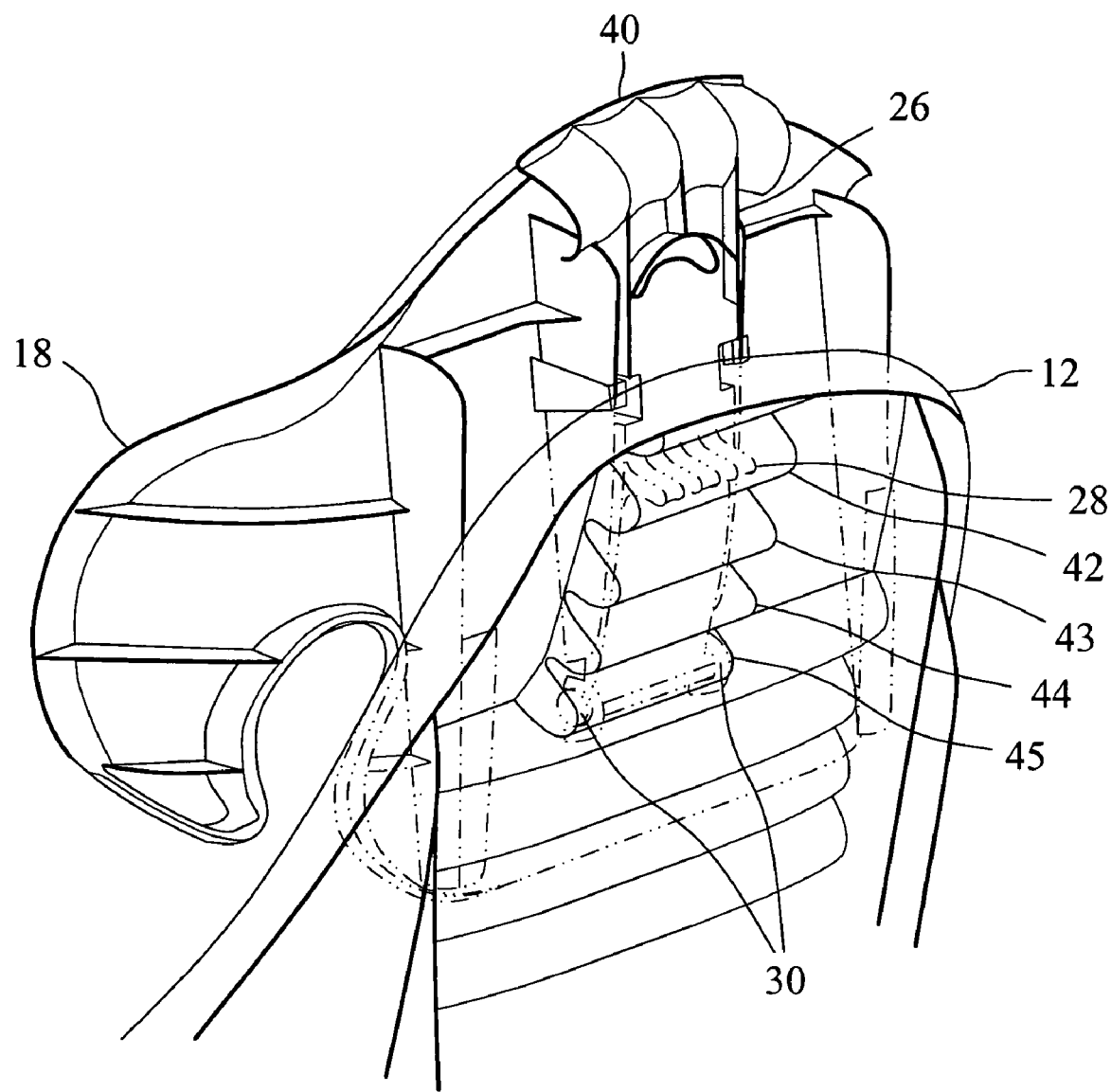
FIG. 5 shows the headrest in the extended (up) position according to an embodiment of the present invention.

In FIG. 3, the headrest is shown in the retracted (down) position. The prong 28 on the lever 26 is engaged with the bottom pocket 45 on the seat body 12. In order to adjust the headrest and put it into another one of the discrete positions, the user actuates the handle 40 on the lever 26 by squeezing the handle 40 and the headrest 18 together. This action forces the lever to rotate about the axis defined by its attachment points 30, and the handle 40 on the lever 26 moves closer to the headrest panel 24 as the angle between the plane defined by the lever 26 and the plane defined by the headrest panel 24 becomes smaller. This rotation of the lever 26 causes the prong 28 to become disengaged with the pockets, allowing the headrest 18 to slide vertically with respect to the seat body 12. The user can then slide the headrest to the desired position. When the headrest is positioned such that the prong 28 is over one of the pockets, the user can release the handle 40 on the lever 26. The spring 36 will restore the lever to its normal position, and the prong 28 will engage with the pocket, thus locking the headrest 18 into position. FIG. 5 shows the headrest in the extended (up) position, with the prong 28 engaged with the top pocket 42 on the seat body 12.

Figure 6:
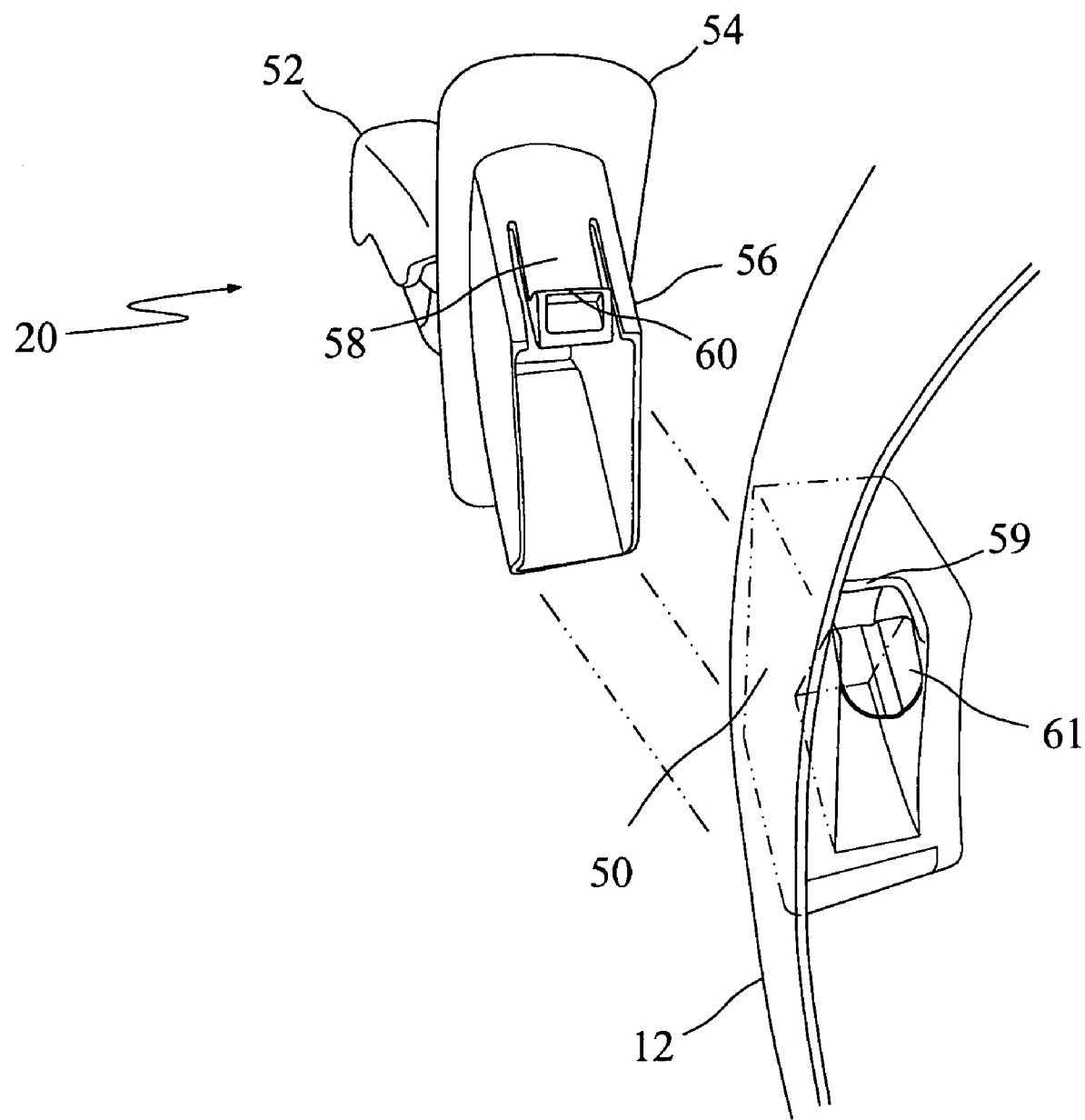
FIG. 6 is a close-up view showing the armrest removed from the body of the car seat, according to an embodiment of the present invention.
Figure 7:
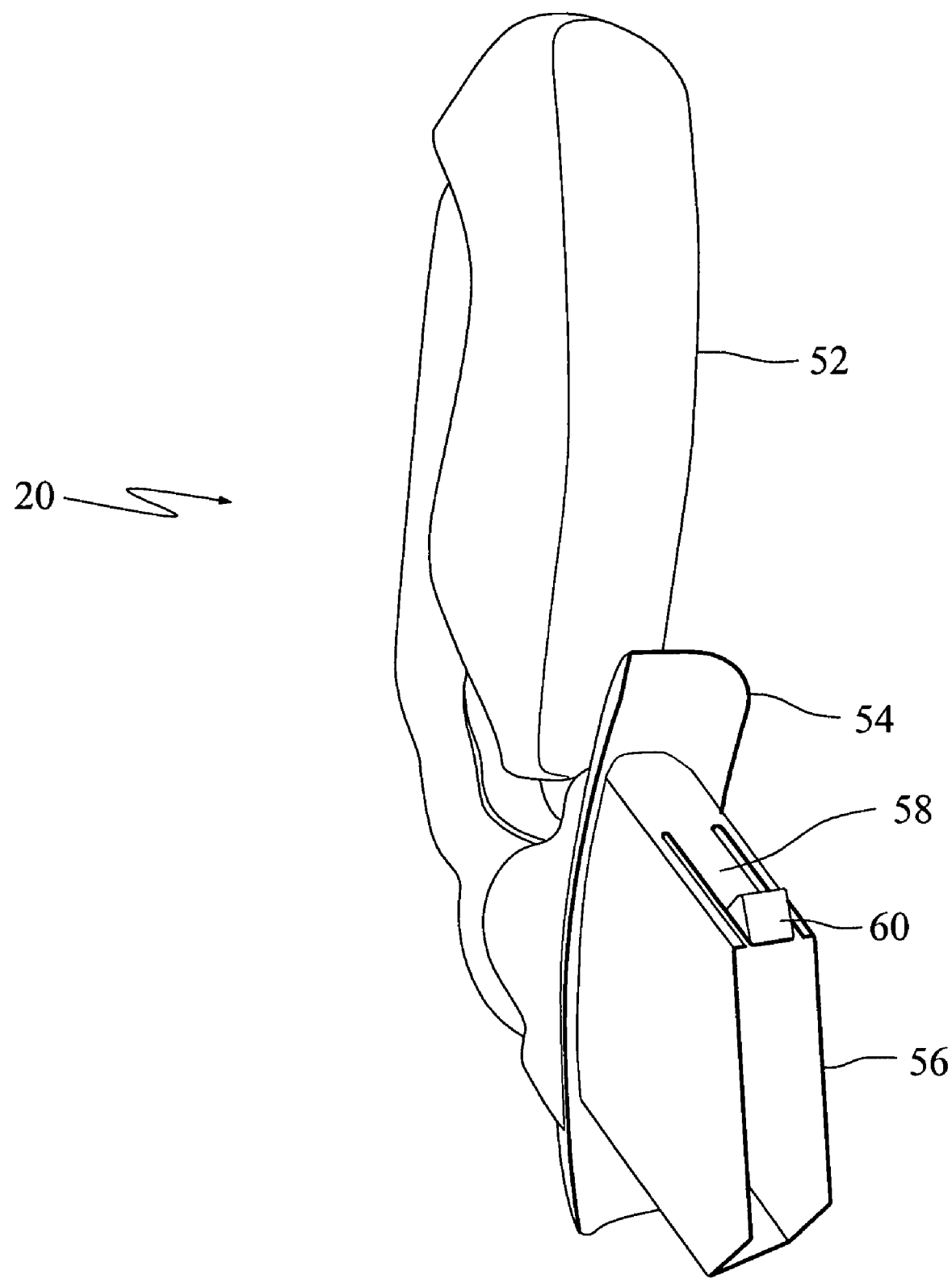
FIG. 7 shows the armrest rotated upward into a raised position, according to an embodiment of the present invention.

In an embodiment of the present invention, the car seat can include removable armrests. FIGS. 6 and 7 show an armrest 20, which can be joined to the seat body 12 at opening 50. The armrest 20 includes an arm portion 52 and a mounting portion 54. The arm portion 52 can be rotated about the mounting portion 54 above the horizontal plane, so that the arm portion can be raised as shown in FIG. 7. The mounting portion 54 has an attachment fairing 56 that fits into the opening 50 on the seat body 12. The attachment fairing 56 includes a locking tab 58 with a flange 60 that locks the armrest in place when joined to the seat body.

When the attachment fairing 56 is inserted into the opening 50, the flange 60 will fit between the top edge 59 of the opening 50 and the release lever 61, both of which hold the locking tab 58 in place.

Figure 8:
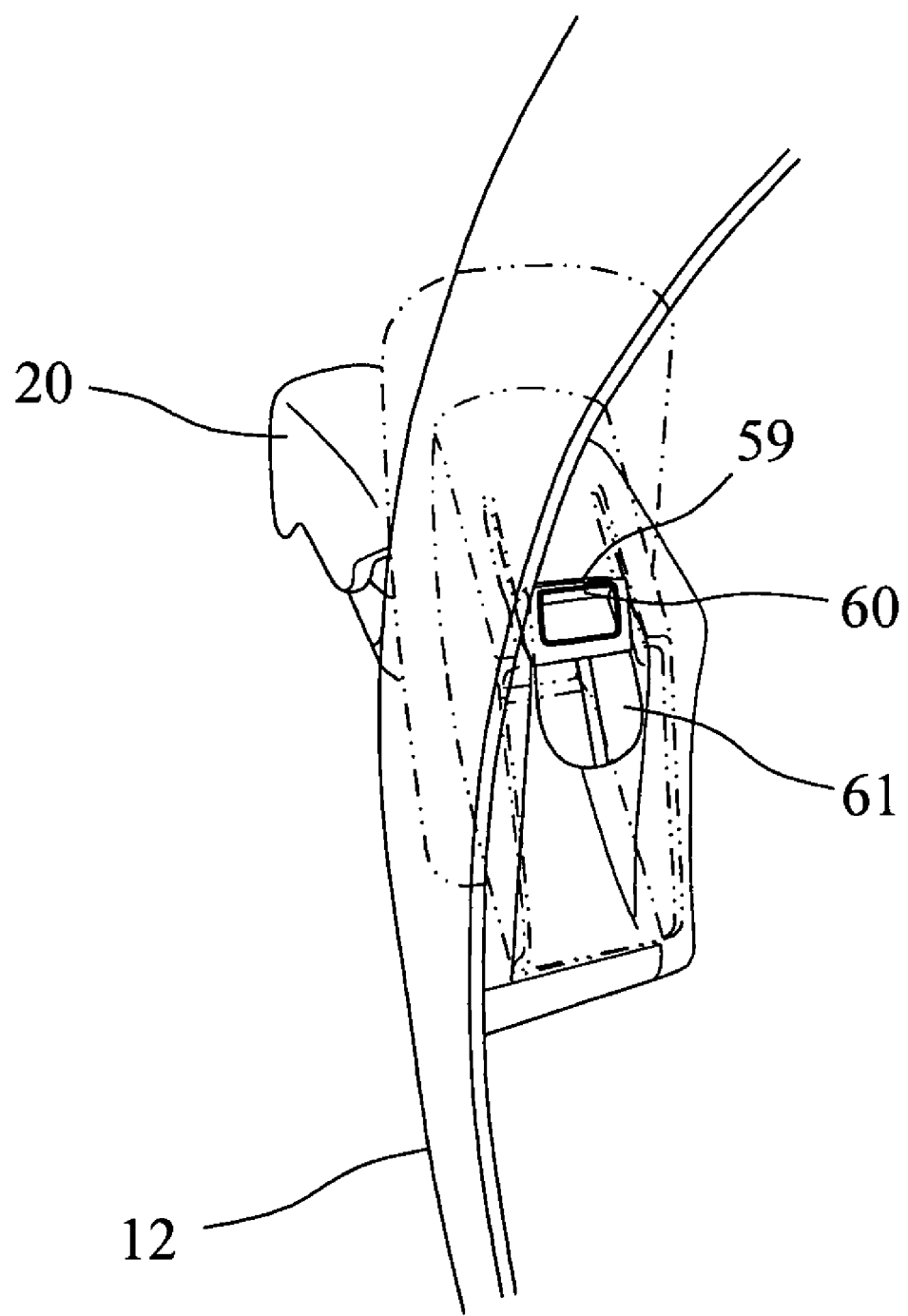
FIG. 8 is a close-up view showing the armrest joined to the body of the car seat, according to an embodiment of the present invention.

FIG. 8 shows the armrest 20 joined to the seat body 12. The attachment fairing 56 has been inserted into the opening 50 in the seat body 12, and the flange 60 on the locking tab 58 is engaged with the top edge 59 of the opening 50 such that the armrest in locked in place. The user can remove the armrest by pressing downward on the release lever 61 and the locking tab 58 so that the flange 60 is no longer engaged with the top edge 59 of the opening 50, thus permitting the attachment fairing 56 to slide out of the opening 50.

Figure 9:
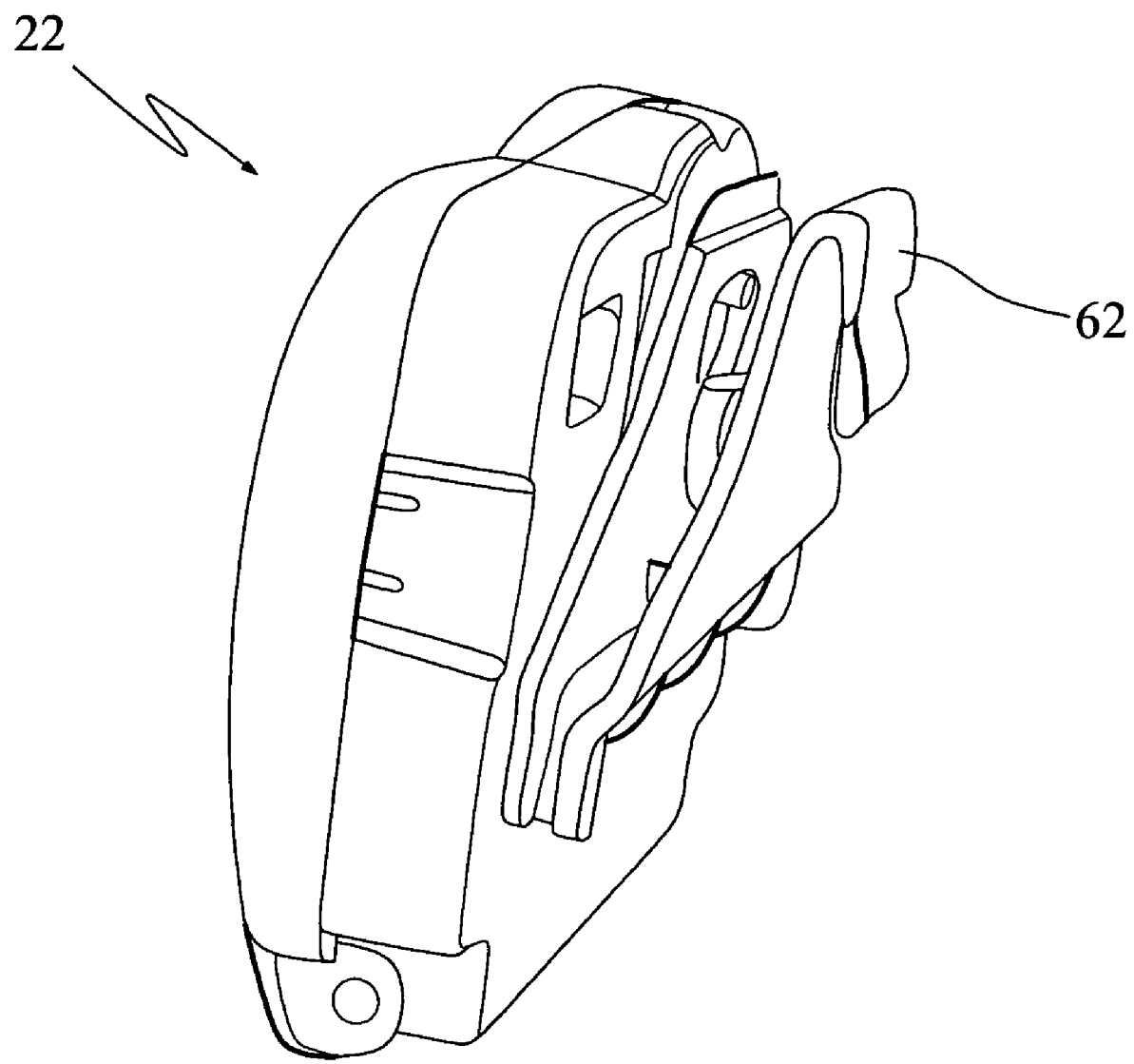
FIG. 9 shows the cup holder removed from the car seat, according to an embodiment of the present invention.
Figure 10:
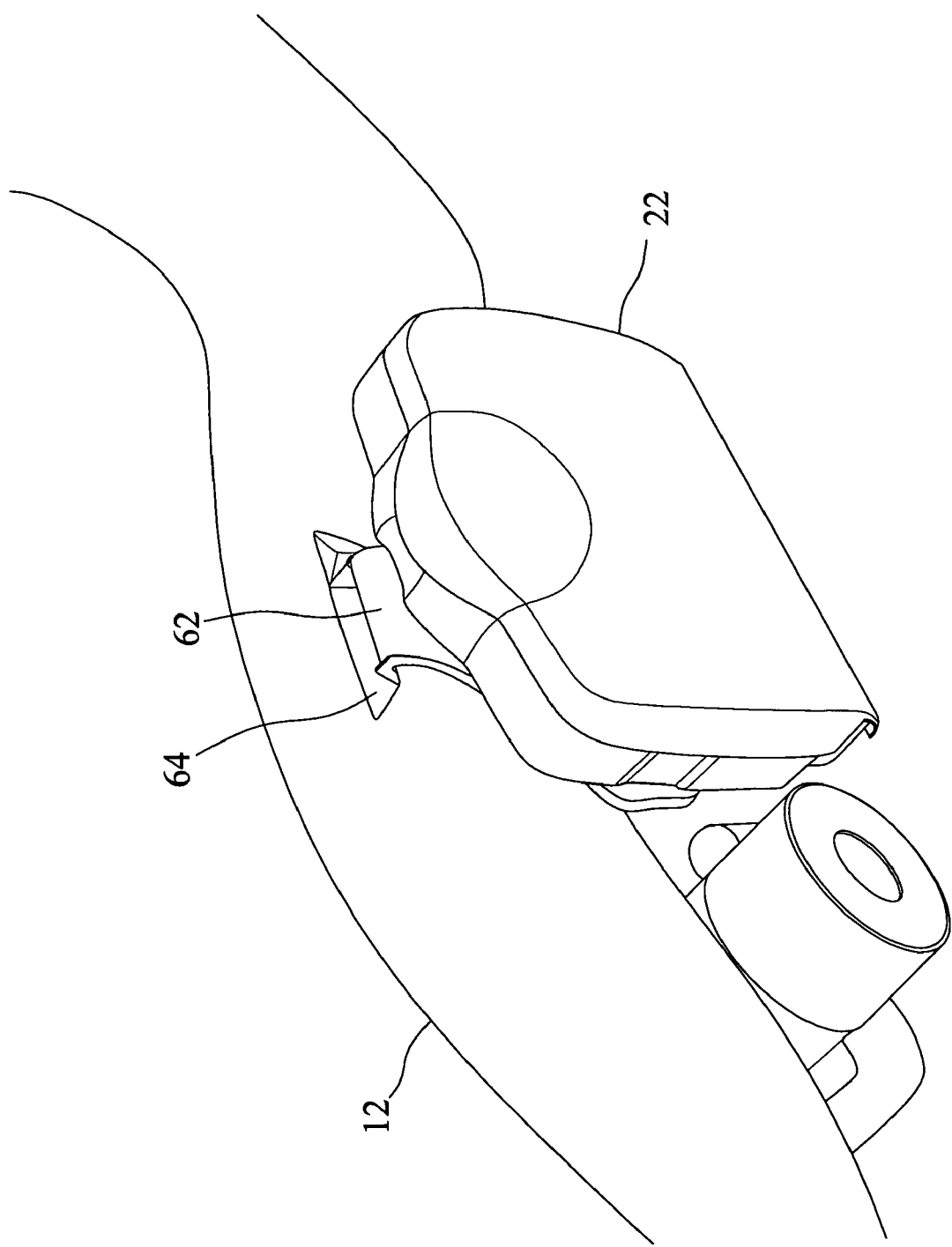
FIG. 10 shows the cup holder attached to the car seat, according to an embodiment of the present invention.
Figure 11:
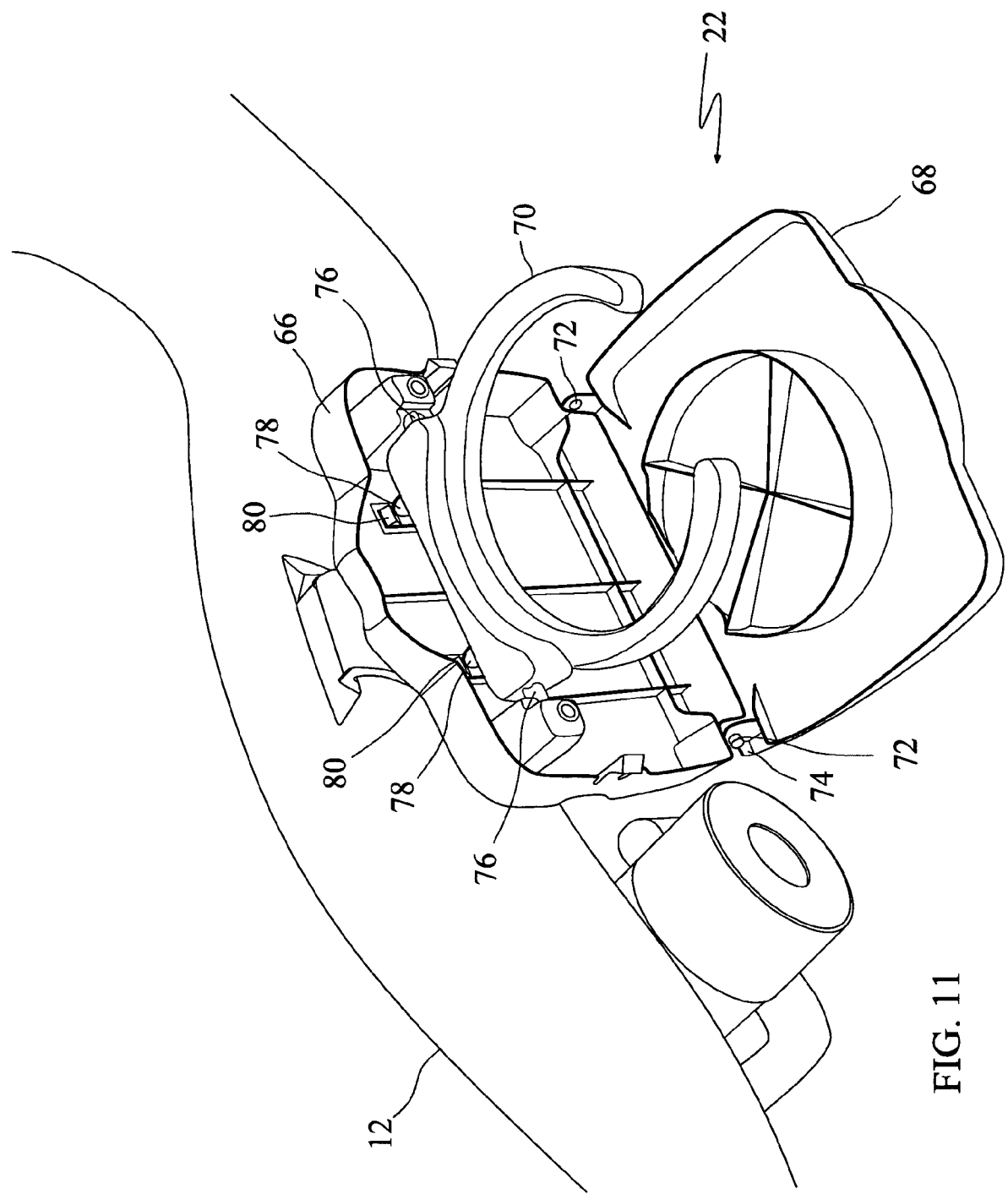
FIG. 11 shows the cup holder in the unfolded configuration, according to an embodiment of the present invention.

In an embodiment of the present invention, the car seat can include a removable folding cup holder. FIG. 9 shows a removable cupholder 22 that can be attached to the car seat 10. The cup holder 22 has a clip 62 that can fit into slot 64 on the seat body 12, thus allowing the cup holder to be attached to the seat body, as shown in FIG. 10. The cup holder can be unfolded, allowing it to accept a cup, as shown in FIG. 11.

The cup holder 22 includes a body 66, a cover 68, and a ring 70. The cover 68 is joined to the body 66 at points 72. The cover 68 can rotate about the axis formed by points 72, allowing it to rotate from the closed position depicted in FIGS. 9 and 10 and the open position depicted in FIG. 11, where the cover is horizontal. A nub 74 on the cover 68 near each attachment point 72 prevents the cover from rotating below the horizontal plane. The ring 70 is joined to the body 66 at points 76, allowing it to rotate upward from the vertical stowed position to the horizontal position depicted in FIG. 11. Upon reaching the horizontal position, tabs 78 on the ring 70 are engaged by flanges 80 on the body 66, thus holding the ring in the horizontal position. The flanges 80 are molded on flexible tabs so that they can allow tabs 78 to become disengaged if the user applies sufficient downward force to the ring 70, thus allowing the ring to be restored to its vertical stowed position by the user.

Having described the invention with reference to embodiments, it is to be understood that the invention is defined by the claims, and it is not intended that any limitations or elements describing the embodiments set forth herein are to be incorporated into the meanings of the claims unless such limitations or elements are explicitly listed in the claims. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. An infant car seat comprising:
   a seat body having a plurality of pockets for receiving a prong;
   a headrest contoured for supporting the head of an infant, the headrest joined to the seat body and adapted for sliding with respect to the seat body; and
   a lever pivotally joined to the headrest and having a prong adapted for engaging any one of the plurality of pockets, whereby the headrest can be positioned in any one of a plurality of discrete positions with respect to the seat body, the plurality of discrete positions corresponding to the plurality of pockets in the seat body.

2. The infant car seat of claim 1, wherein
   the pockets are semicylindrical in shape and oriented parallel to each other.

3. The infant car seat of claim 1, wherein
the pockets are integrally molded into the seat body.

4. The infant car seat of claim 1, wherein
the lever includes a surface adapted for receiving a force applied by a user, whereby the user can actuate the lever.

5. The infant car seat of claim 4, further comprising
at least one spring located between the headrest and the lever for restoring the lever to its original position after being actuated by the user.

6. The infant car scat of claim 5, wherein
the lever is originally positioned such that its prong is engaged with one of the plurality of pockets in the seat body to prevent the headrest from sliding with respect to the seat body; and wherein
upon actuation of the lever by the user, the lever becomes positioned such that its prong is disengaged from the pockets in the seat body, whereby the user can slide the headrest with respect to the seat body.

7. The infant car seat of claim 6, wherein
the seat body has an opening for accepting a removable armrest and a release lever located inside the opening; and further comprising:
an armrest having an arm portion and a mounting portion, the mounting portion having: (i) an attachment fairing adapted for sliding into the opening on the seat body, and (ii) a locking tab having a flange adapted for holding the mounting portion in place within the opening; and wherein
upon sliding the attachment fairing into the opening, the locking tab slides between the release lever and the lop edge of the opening such that the flange on the locking tab is held in place against the top edge of the opening, whereby the attachment fairing is locked in place within the opening; and wherein
upon depression of the release lever and locking tab by a user, the flange on the locking tab becomes disengaged from the top edge of the opening, allowing the mounting fairing to slide out of the opening, whereby the armrest may be removed from the seat body.

8. The infant car seat of claim 7, further comprising:
a foldable cup holder including:
a body having a clip for attaching the foldable cup holder to the seat body;
a cover pivotally joined to the body and capable of rotating downward into a horizontal position perpendicular to the body, and incapable of rotating beyond such horizontal position, whereby the cover can support the weight of a cup placed thereon; and
a ring pivotally joined to the body and capable of rotating upward into a horizontal position perpendicular to the body, and having a flange that engages the body to hold the ring in such horizontal position, whereby the ring can apply horizontal restoring forces to a cup placed within the ring in order to prevent the cup from tipping.

9. The infant car seat of claim 6, further comprising:
a foldable cup holder including:
a body having a clip for attaching the foldable cup holder to the seal body;
a cover pivotally joined to the body and capable of rotating downward into a horizontal position perpendicular to the body, and incapable of rotating beyond such horizontal position, whereby the cover can support the weight of a cup placed thereon; and
a ring pivotally joined to the body and capable of rotating upward into a horizontal position perpendicular to the body, and having a flange that engages the body to hold the ring in such horizontal position, whereby the ring can apply horizontal restoring forces to a cup placed within the ring in order to prevent the cup from tipping.

10. An infant car seat comprising:
a seat body having an opening for accepting a removable armrest;
an armrest having an arm portion and a mounting portion, the mounting portion having: (i) an attachment fairing adapted for sliding into the opening on the seat body, and (ii) a locking tab formed integrally with the attachment fairing and having a flange adapted for holding the mounting portion in place within the opening; and
a foldable cup holder including;
a body having a clip for attaching the foldable cup holder to the seat body;
a cover pivotally joined to the body and capable of rotating downward into a horizontal position perpendicular to the body, and incapable of rotating beyond such horizontal position, whereby the cover can support the weight of a cup placed thereon; and
a ring pivotally joined to the body and capable of rotating upward into a horizontal position perpendicular to the body, and having a flange that engages the body to hold the ring in such horizontal position, whereby the ring can apply horizontal restoring forces to a cup placed within the ring in order to prevent the cup from tipping;
wherein the seat body includes a release lever located inside the opening;
wherein upon sliding the attachment fairing into the opening, the locking tab slides between the release lever and the top edge of the opening such that the flange on the locking tab is held in place against the top edge of the opening, whereby the attachment fairing is locked in place within the opening;
wherein upon depression of the release lever and locking tab by a user, the flange on the locking tab becomes disengaged from the top edge of the opening, allowing the mounting fairing to slide out of the opening, whereby the armrest may be removed from the seat body.

* * * * *